H. W. RODENBECK.
WIND SHIELD HINGE.
APPLICATION FILED FEB. 8, 1911.

991,026.

Patented May 2, 1911.
2 SHEETS—SHEET 1.

WITNESSES:
Andrew K. Martell
Hanna Mendenhall

INVENTOR.
Henry W. Rodenbeck
BY
Claude L. McKesson
ATTORNEY.

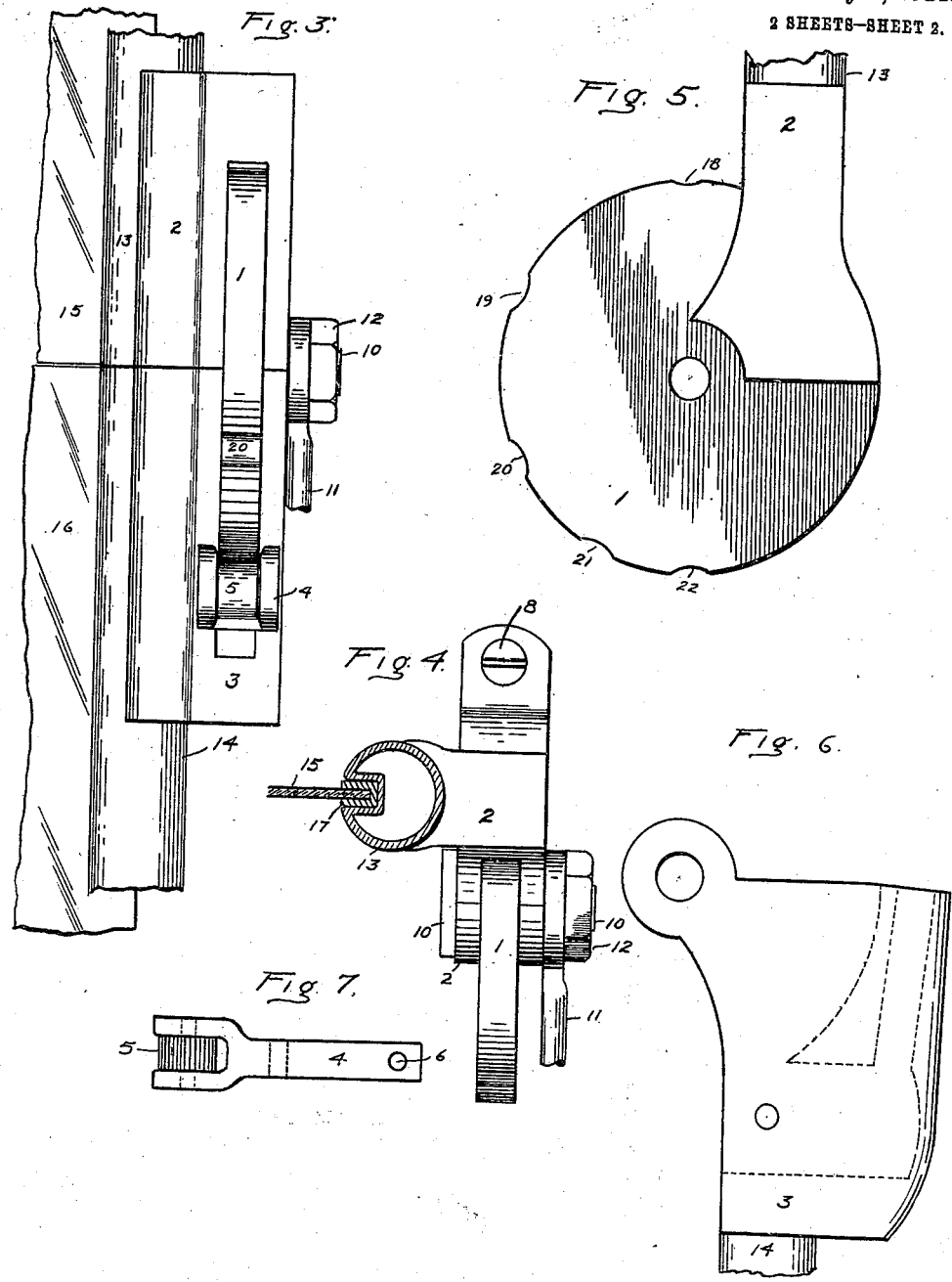

UNITED STATES PATENT OFFICE.

HENRY W. RODENBECK, OF LOS ANGELES, CALIFORNIA, ASSIGNOR TO HEARD MANUFACTURING COMPANY, OF LOS ANGELES, CALIFORNIA, A CORPORATION OF CALIFORNIA.

WIND-SHIELD HINGE.

991,026.  Specification of Letters Patent.  Patented May 2, 1911.

Application filed February 8, 1911. Serial No. 607,278.

*To all whom it may concern:*

Be it known that I, HENRY W. RODENBECK, a citizen of the United States, residing at Los Angeles, California, have invented a new and useful Wind-Shield Hinge, of which the following is a specification.

My invention relates to an improved construction in wind shield hinges providing a high degree of durability, and a simple and compact mechanism.

The construction, uses and manner of operation are hereinafter set forth and are shown in the accompanying drawings, in which—

Figure 1:
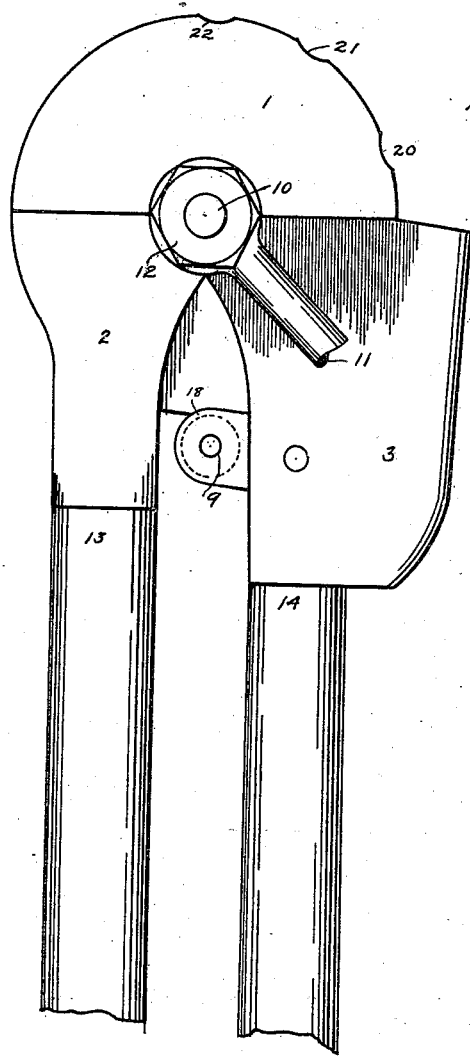
Figure 2:
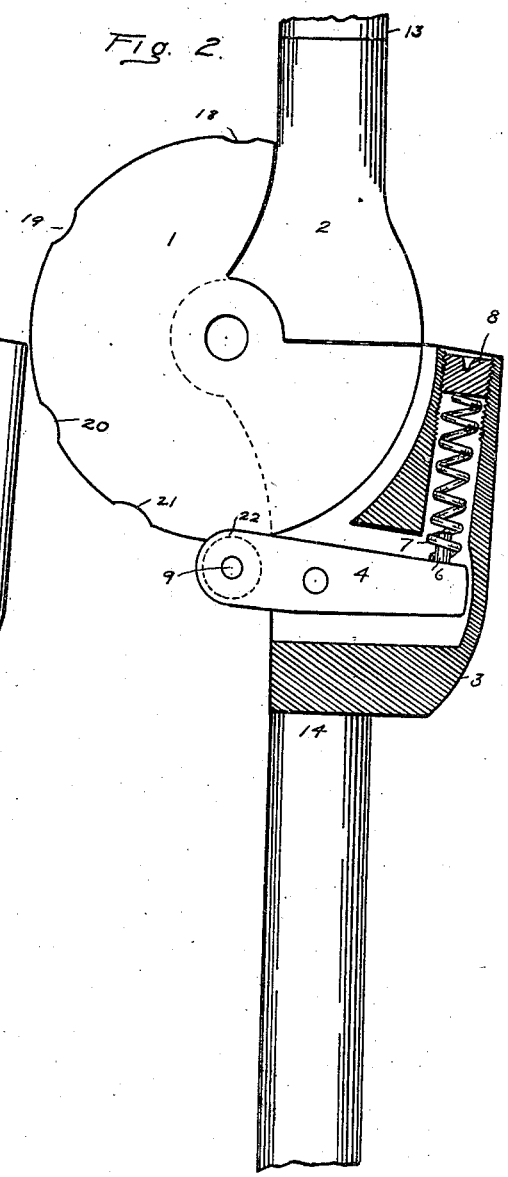

Figure 1 is a side view of a complete hinge, also showing a short section of the frame of an ordinary automobile wind shield; Fig. 2 is a view of the same parts shown in Fig. 1, with a portion of one of the hinge members broken away to more fully illustrate the interior construction; Fig. 3 is an edge view of the hinge; Fig. 4 is a top plan view of the parts shown in Fig. 3; Fig. 5 is a side view of the upper hinge member; Fig. 6 is a side view of the lower hinge member and Fig. 7 is a view of the brake lever and wheel.

Throughout the several views, like characters refer to like parts.

Referring to the details of construction: 1 is a circular disk which forms the tongue of the hinge and the edge of which also serves as a brake wheel; 2 is the upper movable member of the hinge and in construction is permanently attached to the disk 1. The parts 1 and 2 may, if desired, be cast in one piece.

3 is the lower hinge member and in construction is slotted to receive the disk 1 and also the lever 4 and friction wheel 5; 6 is a pin on the end of the lever 4 and 7 is a spiral spring operating in a suitable chamber in the hinge member 3. The interior of the spring chamber is threaded to receive the threaded plug 8 in the manner shown. The end of the lever 4 is forked as shown to receive the roller 5 and a pivot 9 retains the roller in place. A bolt 10, passing through the slotted hinge member 3 and the disk 1, forms the main pivotal center of the hinge. A stay rod 11 may also be attached to the bolt 10, passing thence to the body of the automobile for the purpose of bracing the shield. 12 is a nut on the end of the bolt 10.

13 and 14 are, respectively, the upper and the lower sections of the wind shield frame which are hinged together. The member 2 is shaped to receive the upper part 13 of the wind shield frame in the manner shown, and the said parts 2 and 13 are brazed or otherwise attached to each other. The inside surface of the member 3 is similarly arranged to receive the lower frame member 14 and they are brazed together.

15 is the glass in the upper section of the wind shield and 16 is the glass in the lower section. In Fig. 4 a cross section of the tubing 13 is shown and 17 is a rubber setting as ordinarily used to retain the glass. Various notches are cut in the edge of the disk 1 as indicated by 18, 19, 20 and 21.

In operation a pair of the hinges constructed as above are attached to the opposite sides of the wind shield frame. The roller 5, in the end of the brake lever 4, operates on the edge of the disk 1 and the adjustment of the spring 7 is varied by the use of the screw plug 8 to secure any desired amount of pressure between the roller and the disk. As the hinge is opened and closed the roller 5 engages the various notches 18, 19, 20 and 21, in the order of their arrangement. The resistance offered by the roller as it is forced up and out of each of the notches is sufficient to hold the shield in any desired position. The face of the roller is preferably milled to prevent its slipping on the disk.

I am aware of my prior invention of and application for Letters Patent upon a wind shield hinge in which a brake lever and roller operate upon the edge of a disk similar in manner to the one above described and I disclaim any portion of the device herein described and shown in the accompanying drawings which I have heretofore shown, described and claimed in my previous application now pending in the United States Patent Office, being Serial Number 579545, filed on the 29th day of August, 1910.

What I do claim as new and desire to secure by Letters Patent is:

In a wind shield hinge; the combination of a notched disk 1 attached to the upper member 2 of said hinge; said upper hinge member 2 to which one section of the wind shield is attached; a lower hinge member 3 slotted to receive the disk 1 and the lever 4; said lever 4; a suitable pivot upon which said lever operates; a roller 5 in the forked end of the lever 4 for engaging the notches in the disk 1; a suitable pivot 9 upon which said roller operates; a pin on the inner end of said lever for preventing the spring from slipping off; an internally threaded spring chamber in the lower hinge member and above the brake lever 4; a spring 7 compressed in said spring chamber and operating between the screw plug 8 and the lever 4, and a bolt 10 passing through the lower hinge member 3 and through the disk 1, all substantially as described and for the uses and purposes set forth.

HENRY W. RODENBECK.

Witnesses:
M. RIEDER,
L. B. HEARD.

---

Copies of this patent may be obtained for five cents each, by addressing the "Commissioner of Patents, Washington, D. C."